(12) United States Patent
Showalter

(10) Patent No.: US 8,256,596 B2
(45) Date of Patent: Sep. 4, 2012

(54) OUTER HOUSING GEOMETRY FOR ALIGNING CLUTCH PLATES

(75) Inventor: Dan J. Showalter, Plymouth, MI (US)

(73) Assignee: Borgwarner, Inc., Auburn Hills, MI (US)

( * ) Notice: Subject to any disclaimer, the term of this patent is extended or adjusted under 35 U.S.C. 154(b) by 714 days.

(21) Appl. No.: 12/368,421

(22) Filed: Feb. 10, 2009

(65) Prior Publication Data

US 2009/0200131 A1    Aug. 13, 2009

Related U.S. Application Data

(60) Provisional application No. 61/027,934, filed on Feb. 12, 2008.

(51) Int. Cl.
  *F16D 13/54* (2006.01)
  *B23P 15/00* (2006.01)
(52) U.S. Cl. .......................................... 192/70.2; 29/464
(58) Field of Classification Search .................. 192/70.2, 192/70.19, 69.83; 29/274; 403/359.4
  See application file for complete search history.

(56) References Cited

U.S. PATENT DOCUMENTS

| 2,821,277 | A | * | 1/1958 | Hughes | 192/69.91 |
| 3,265,173 | A | * | 8/1966 | Russell | 192/69.91 |
| 4,640,294 | A | * | 2/1987 | Ordo | 192/70.2 |
| 4,727,770 | A | * | 3/1988 | Ordo | 475/317 |
| 5,503,494 | A | * | 4/1996 | Kamata et al. | 403/359.6 |
| 6,244,413 | B1 | * | 6/2001 | Gutmann et al. | 192/108 |
| 6,553,643 | B2 | * | 4/2003 | Relan et al. | 29/464 |

* cited by examiner

*Primary Examiner* — Rodney Bonck

(74) *Attorney, Agent, or Firm* — Brinks Hofer Gilson & Lione

(57) ABSTRACT

An outer housing for a clutch assembly that allows for the housing to be placed over an already assembled multi-disc clutch pack. The outer housing incorporates a plurality of internally splined grooves, a lead-in chamfer to assist in the alignment of the center line between the housing and the center line of the clutch pack, and an index chamfer on elevated ridges that reside between the splined grooves to assist in the alignment of the splined teeth of outer clutch plates in the assembled clutch pack with said splined grooves.

11 Claims, 3 Drawing Sheets

OUTER HOUSING GEOMETRY FOR ALIGNING CLUTCH PLATES

FIELD OF INVENTION

This invention relates to power train components and particularly to a clutch assembly adapted for motor vehicle applications incorporating a means for applying the housing to an assembled multi-disc clutch pack.

BACKGROUND OF THE INVENTION

The invention relates generally to power train components wherein a clutch assembly incorporated within a gear train is used to connect and disconnect engine power flow to a transmission or other power train components. Each clutch assembly is comprised of a multi-disc clutch pack and a clutch assembly shaft encased within an outer cylindrical housing. Each clutch pack includes a plurality of inner and outer clutch plates alternatively stacked together with the outer perimeter of each outer clutch plate and the inner perimeter of each inner clutch plate comprising splined teeth. During operation, splined grooves in the housing actively engage the splined teeth of the outer clutch plates, while splined grooves in the shaft actively engage the splined teeth of the inner clutch plates. When clamping pressure is applied against the clutch pack, frictional force couples the inner and outer clutch plates together causing the shaft and housing to rotate as one unit.

Typically, the multi-disc clutch pack, which is manually loaded within the housing, requires the operator to physically align the teeth of the outer clutch plates with the grooves in the housing. This manual loading results in a slow and uneconomical process. A conventional solution has been to manufacture the housing as two separate components in order to place the housing around an already assembled clutch pack. However, since this conventional solution requires one to manufacture an additional component, it also results in an uneconomical process.

Therefore, there is a need and desire in the industry to provide an economical means to incorporate a multi-disc clutch pack into an outer housing.

BRIEF SUMMARY OF THE INVENTION

The present invention is directed to an outer housing for a clutch assembly that allows for the housing to be aligned with the outer splines of the outer clutch plates and placed over a plurality of interleaved inner and outer clutch plates present in an assembled multi-disc clutch pack. Although the inner and outer clutch plates are interleaved, the splines of such plates may be misaligned. The outer housing has a cylindrical wall having a plurality of internally splined grooves, wherein the cylindrical wall also incorporates a lead-in chamfer to assist in the alignment of the center line between the outer housing and the center line of the clutch pack. The outer housing also has index chamfers on each elevated ridge that resides between the internally splined grooves to assist in the alignment of said splined grooves with the splined teeth of the outer clutch plates in the assembled clutch pack.

It is thus an object of the present invention to provide an outer housing having a cylindrical wall that can be placed over an already assembled multi-disc clutch pack, whose outer clutch plates are indexed for alignment with the outer housing.

It is a further object of the present invention to provide an outer housing incorporating a lead-in chamfer and index chamfers to assist in the alignment and assemblage of the clutch assembly.

It is a further object of the present invention to provide a simple method for assembling an outer housing over outer and inner clutch plates that are already interleaved in a multi-disc clutch pack.

Other objects and advantages of the present invention will become apparent upon considering the following detailed description and appended claims, and upon reference to the accompanying drawings.

BRIEF DESCRIPTION OF THE DRAWINGS

The drawings described herein are for illustration purposes only and are not intended to limit the scope of the present disclosure in any way.

DETAILED DESCRIPTION OF THE INVENTION

Figure 1:
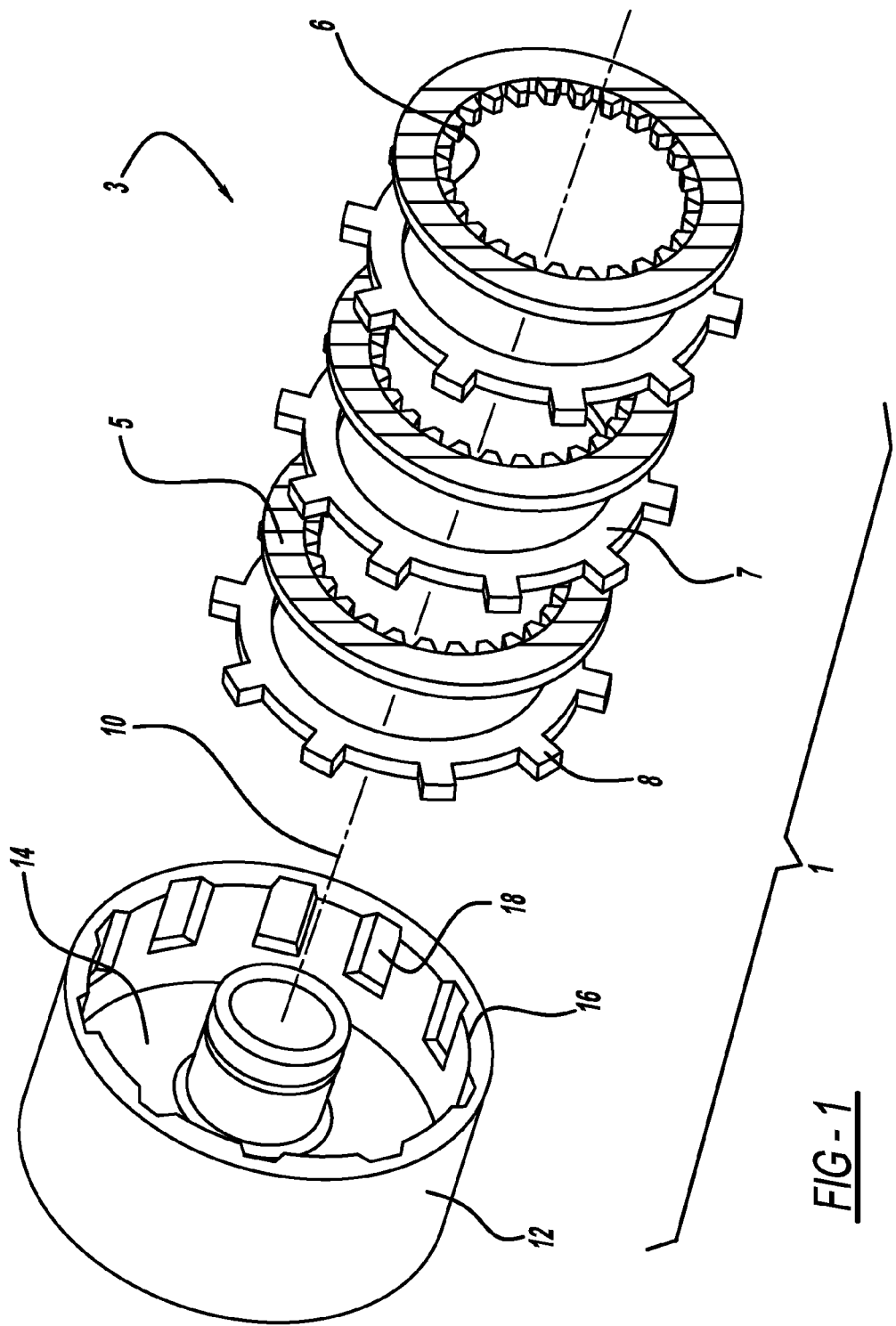
FIG. 1 is a diagrammatic view of a clutch assembly illustrating the alignment of splined grooves within a cylindrical outer housing with the splined teeth on the outer perimeter of outer clutch plates in an assembled multi-disc clutch pack.

The following description of the preferred embodiment is merely exemplary in nature and is in no way intended to limit the invention or its application or uses. It should be understood that throughout the description and drawings, corresponding reference numerals indicate like or corresponding parts and features.

Referring to FIG. 1, a multi-disc clutch pack 3 and an outer housing 12 may be aligned along a common longitudinal center line 10. The housing 12, which is cylindrical in form, includes cylindrical wall 16 having multiple, internally splined grooves 18 on its inner diameter that run parallel to the center line 10. Although the outer housing 12 is depicted as having an annular base 14 integrally formed with the cylindrical wall 12, such annular base is optional. The multi-disc clutch pack 3 preferably includes a plurality of both inner clutch plates 5 and outer clutch plates 7 alternatively interleaved. However, the clutch pack 3 may include as few as one inner 5 and outer 7 clutch plate. Each outer clutch plate 7 further includes a plurality of splined teeth 8 on its outer perimeter that are complementary to and can engage with the internally splined grooves 18 present in the cylindrical wall 16 of the outer housing 12. Preferably the number of splined teeth 8 on each outer clutch plate 7 is the same as the number of splined grooves 18 in the cylindrical wall 16 of the outer housing 12.

Each inner clutch plate 5 includes a plurality of splined teeth 6 on its inner perimeter that are complementary to and can engage with the splined grooves present in a clutch assembly shaft (not shown). The surface of the inner clutch plates and/or outer clutch plates may include a friction material, facing, or lining. Such friction material may be applied to the surface of the clutch plates by bonding, coating, sintering, or any other technique known to one skilled in the art. The friction materials may be organic or metallic in nature with woven, wound, or molded fiber composites, and sintered metallic, metallic-ceramic or metallic-graphitic materials being commonly used in the industry. Several examples of organic and sintered metallic materials include; but are limited to, organic: Kevlar fibers, asbestos, and cotton; and metallic: soft copper, bronze, iron, and iron-bronze. Grooves may be cut into the friction material to aid in cooling and assist the release or separation between the inner and outer clutch plates.

Figure 2:
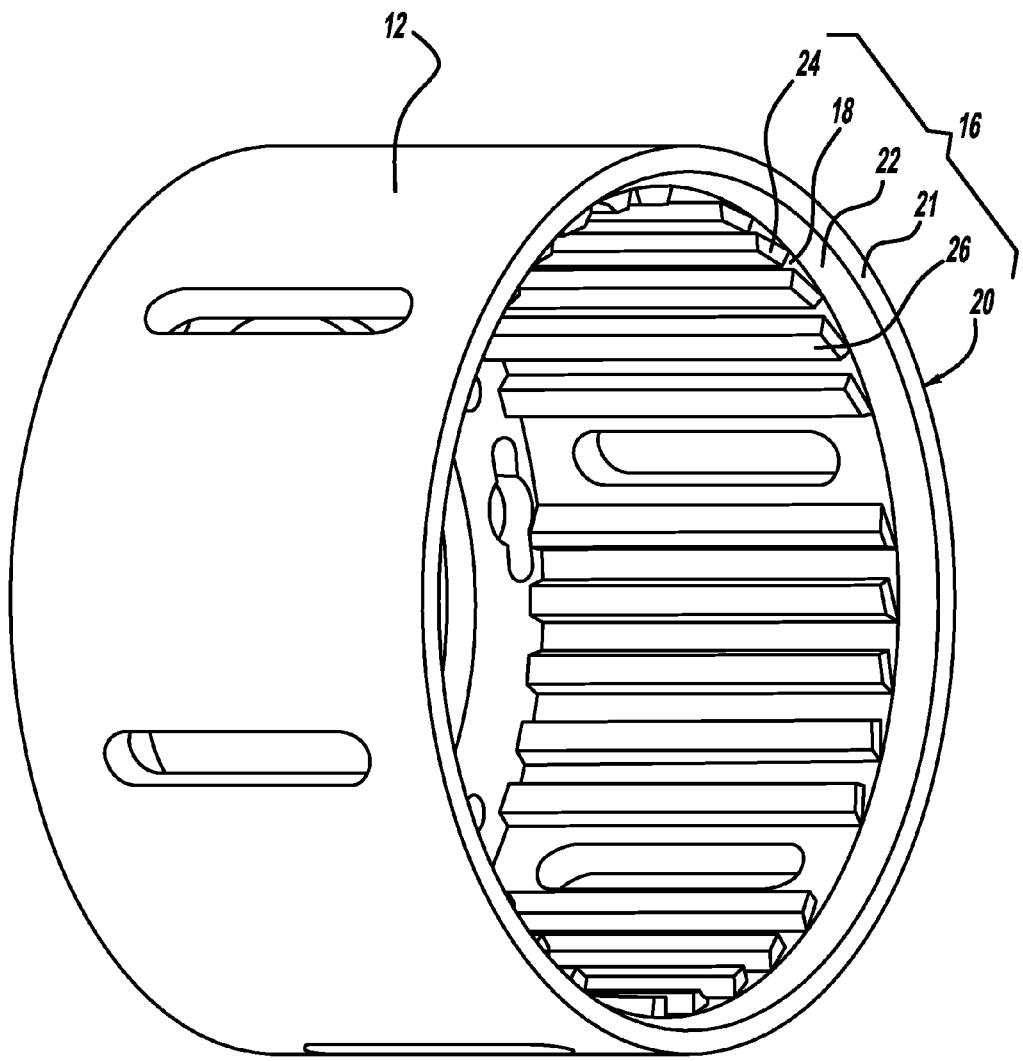
FIG. 2 is diagrammatic view of one embodiment of the present invention illustrating a cylindrical housing that incorporates both a lead-in chamfer and index chamfers in the design of the housing.

In one embodiment of the present invention, the outer housing 12 includes a lead-in chamfer 22 as shown in FIG. 2. The lead-in chamfer encompasses the entire end face or perimeter of the open end of the outer housing 12. The lead-in chamfer aids in the alignment or centering of an assembled clutch pack 3 with the outer housing 12. The lead-in chamfer helps to insure that the center line of the outer housing 12 and the center line of the assembled clutch pack 3 are the same center line 10.

Figure 3:
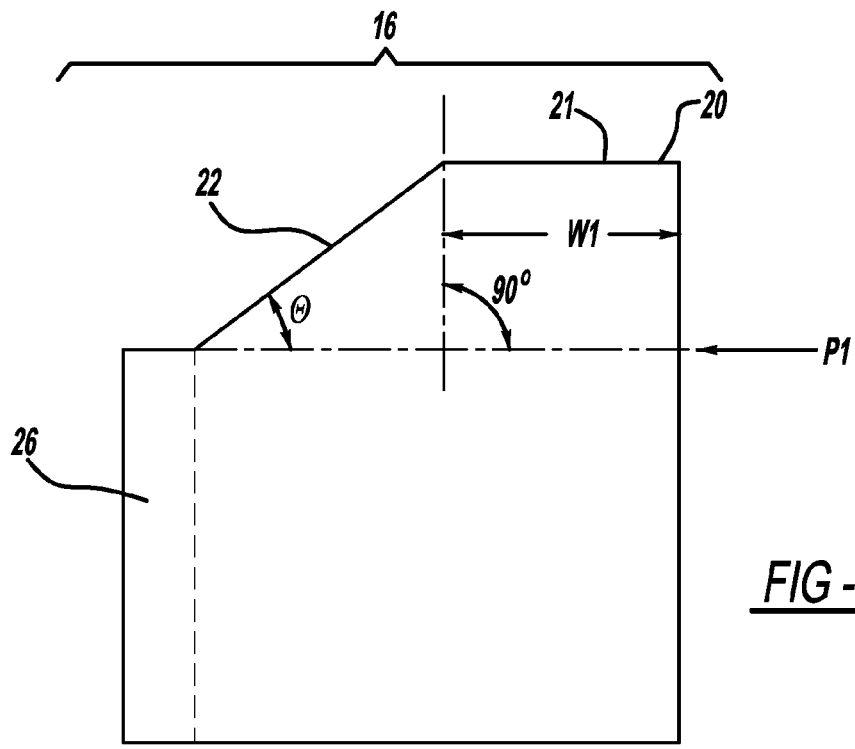
FIG. 3 is a diagrammatic cross-sectional view of the cylindrical wall of the outer housing describing the design of a lead-in chamfer.

The lead-in chamfer 22 establishes a surface that extends from the edge of a relatively flat end face surface 21 encompassing the outer edge 20 of the cylindrical wall 16 to the start of the elevated ridges 26 that reside between the internally splined grooves 18 of the housing. The width (W1) of this flat end face surface 21 may range from about zero inch to about one inch. In the case where the width (W1) is zero inches, the lead-in chamfer 22 extends to the outer edge 20 of the cylindrical wall 16. The surface of the chamfer 22 preferably makes an angle ($\theta$) with a diametric plane (P1) parallel to the outer edge 20 of the cylindrical wall 16 as shown in FIG. 3. This angle ($\theta$) may be less than about 60 degrees with less than about 30 degrees being preferred. The effectiveness of the lead-in chamfer may diminish as this angle ($\theta$) becomes larger. One skilled-in-the-art would understand and realize that multiple different angles are permissible.

Figure 4:
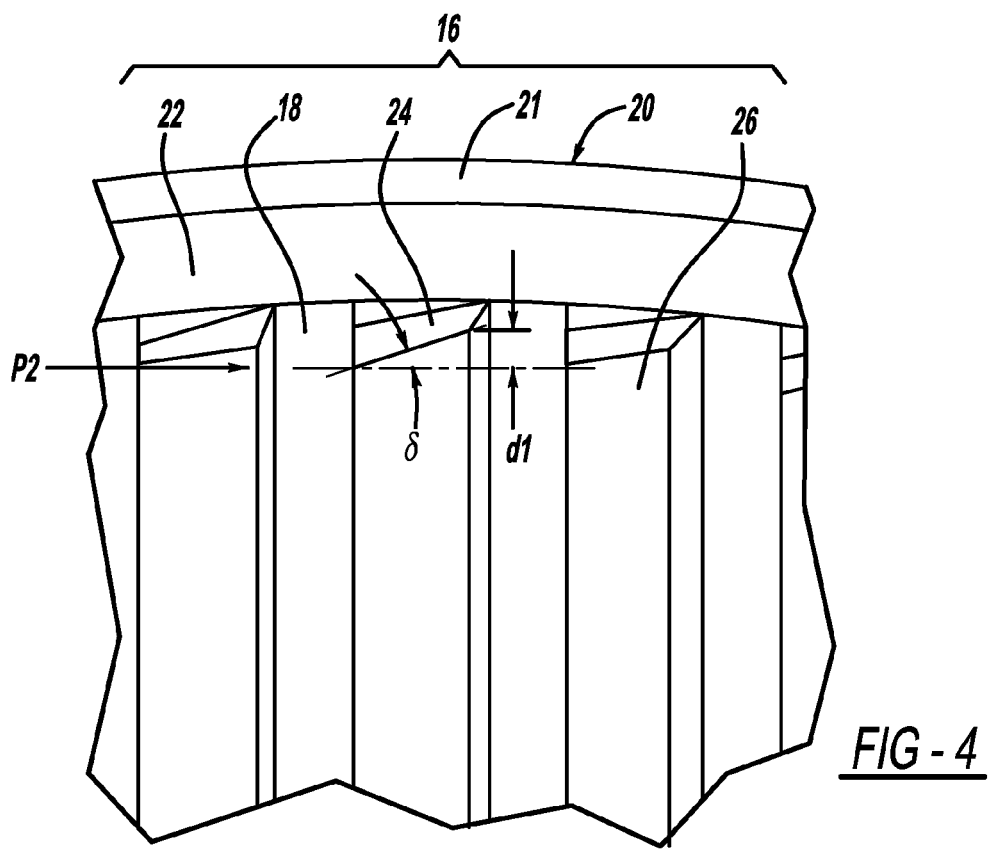
FIG. 4 is a diagrammatic view of the cylindrical wall of the outer housing describing the design of an index chamfer.

In one embodiment of the present invention, the outer housing 12 includes an index chamfer 24 on each of the elevated ridges 26 that reside between the internally splined grooves 18 of the housing. The index chamfers 24 assist in aligning the teeth 8 on the outer clutch plates 7 with the splined grooves 18 in the cylindrical wall 16 of the outer housing 12. Referring to FIG. 4, the end surface of the index chamfer 24 preferably makes an angle ($\delta$) of about 30 to about 60 degrees with a diametric plane (P2) parallel to the lead-in chamfer 22 of the cylindrical wall 16. However, one skilled-in-the-art would understand and realize that other angles are permissible. The index chamfer 24 is further defined by a depth (d1) that corresponds to the distance from the top or start of the chamfer to the plane (P2) as shown in FIG. 4. A depth (d1) that is greater than or equal to about one-half (½) the thickness of an outer clutch plate 7 is preferred. This depth helps to insure that alignment of the teeth 8 on the outer clutch plates 7 with the splined grooves 18 is maintained, thereby, minimizing any slippage that may occur during the assembly of the outer housing 12 over the multi-disc clutch pack 3.

The outer housing 12 may be manufactured as a single component having a cylindrical wall 16 that ends at the outer edge 20. Optionally, the outer housing 12 may have an annular bottom 14 integrally formed with the cylindrical wall 12. During assemblage of the clutch assembly 1, the lead-in chamfer 22 assists the operator in aligning the center line 10 between the outer housing 12 and the assembled multi-disc clutch pack 3. Rotating the outer housing 12 while applying a slight amount of pressure upon contact between the outer housing 12 and the multi-disc clutch pack 3 allows the index chamfers 24 to aid in the alignment of the splined teeth 8 on the outer clutch plates 7 with the internally splined grooves 18 in the cylindrical wall 16 of the outer housing 12. Once the splined teeth 8 and grooves 18 are aligned, the outer housing 12 may be pushed in place to cover the clutch pack 3.

The foregoing disclosure is the best mode devised by the inventors for practicing this invention. It is apparent however, that devices incorporating modifications and variations will be obvious to one skilled in the art of clutch assemblies. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A clutch assembly comprising,
a multi-disc clutch pack having at least one inner clutch plate and at least one outer clutch plate, wherein said outer clutch plate has a plurality of splined teeth on its outer perimeter; and
an outer housing having a cylindrical wall with an inner perimeter, a flat end face surface, and an outer edge,
wherein said cylindrical wall has a plurality of internally splined grooves and elevated ridges residing between said splined grooves,
wherein said cylindrical wall has a lead-in chamfer encompassing the inner perimeter to assist in a radial alignment of the outer housing with the multi-disc clutch pack, the lead-in chamfer radially guiding the inner and outer clutch plates into the outer housing during assembly of the clutch pack assembly, and
wherein the cylindrical wall has a unidirectional index chamfer formed by axial end surfaces on the plurality of the ridges, each end surface having an angular deviation from the flat end face surface in circumferential direction, all axial end surfaces of the ridges having the same angular deviation from the flat end face surface in the circumferential direction, the index chamfer being configured to guide the splined teeth of the outer clutch plates into circumferential alignment with the splined grooves of the outer clutch plates in the clutch pack during assembly of the clutch pack assembly.

2. The clutch assembly of claim 1, wherein the outer housing has an annular base integrally formed with the cylindrical wall.

3. The clutch assembly of claim 1, wherein the surface of the lead-in chamfer makes an angle ($\theta$) less than about 60 degrees with a diametric plane (P1) parallel to the outer edge of the cylindrical wall.

4. The clutch assembly of claim 3, wherein the surface of the lead-in chamfer makes an angle ($\theta$) less than about 30 degrees with a diametric plane (P1) parallel to the outer edge of the cylindrical wall.

5. The clutch assembly of claim 1, wherein the inner perimeter of the cylindrical wall is encompassed by a relatively flat end face surface to which the lead-in chamfer is integrally formed.

6. The clutch assembly of claim 5, wherein the relatively flat end face surface to which the lead-in chamfer is integrally formed has a width (W1) ranging from about zero inch to about one inch.

7. The clutch assembly of claim 1, wherein the axial end surfaces of the index chamfer make an angle ($\delta$) of about 30 to about 60 degrees with the flat end face surface.

8. The clutch assembly of claim 1, wherein the index chamfer has a depth (d1), which is greater than about one-half (½) the thickness of an outer clutch plate.

9. The clutch assembly of claim 1, wherein the number of internally splined grooves in the cylindrical wall of the outer housing is the same as the number of splined teeth on the outer perimeter of the outer clutch plates in the clutch pack.

10. The clutch assembly of claim 1, wherein the surface of the inner clutch plate comprises a frictional material, facing, or lining.

11. A method of assembling a clutch assembly comprising:

aligning the center line of an outer housing with the center line of a multi-disc clutch pack via the use of a lead-in chamfer residing on the inner perimeter of the outer housing;

aligning the splined teeth of the outer clutch plates in a multi-disc clutch pack with the internally splined grooves of the outer housing through the use of unidirectional index chamfers located on the elevated ridges residing between said splined grooves;

applying slight pressure and rotation to the housing in order to place the splined teeth of the outer clutch plates into the splined grooves of the housing; and pushing the housing over the clutch pack.

\* \* \* \* \*